Aug. 16, 1927.

G. J. ARMSTRONG

Re. 16,708

SAND PUMP

Original Filed June 30, 1924 2 Sheets-Sheet 1

Inventor

George J. Armstrong

By Brown & Thomas

Attorneys

Aug. 16, 1927.

G. J. ARMSTRONG

SAND PUMP

Original Filed June 30, 1924 2 Sheets-Sheet 2

Re. 16,708

Inventor

George J. Armstrong

By Baum & Thomas

Attorneys

Reissued Aug. 16, 1927. Re. 16,708

UNITED STATES PATENT OFFICE.

GEORGE J. ARMSTRONG, OF BURKBURNETT, TEXAS.

SAND PUMP.

Original No. 1,547,285, dated July 28, 1925, Serial No. 723,416, filed June 30, 1924. Application for reissue filed June 3, 1927. Serial No. 196,362.

The invention relates to sand pumps to be used in connection with producing oil wells for the purpose of removing sand from the gathering reservoir of the well.

The chief object of the invention is to provide a cutting and mixing member in combination with the lower valve to agitate and mix the sand with the fluid so it will be more easily pumped into the pump barrel.

A further object is to provide a means of attaching the lower valve to the pump barrel enabling the same to be quickly attached or removed when emptying the barrel.

Further objects and advantages will be apparent as the invention is more fully disclosed.

With the foregoing in view the invention resides in the novel subject matter hereinafter described and claimed, the description being supplemented by the accompanying drawing, wherein, Figure 1 is a central longitudinal sectional view.

Figure 1:
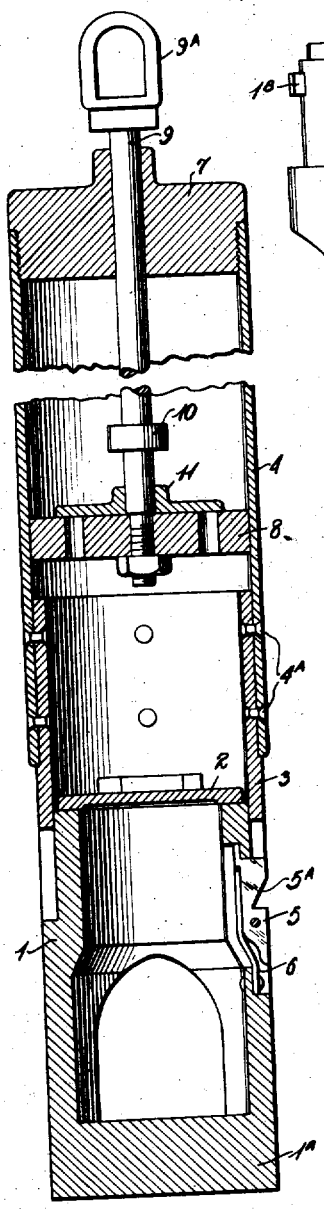
Figure 2:
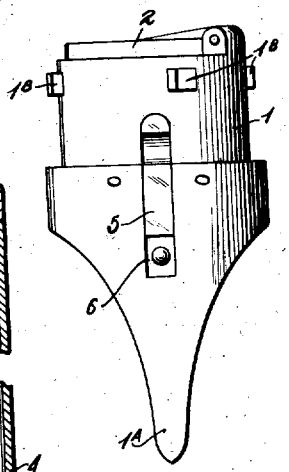
Figure 2 is a side plan view of the cutting member and lower valve.
Figure 4:
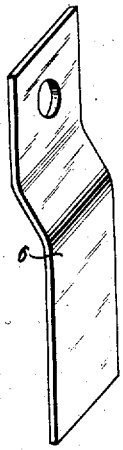
Figure 4 is a perspective view of the locking member spring.
Figure 3:
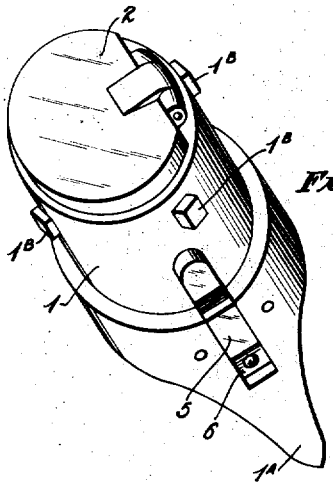
Figure 3 is a perspective view of the cutting member and valve showing the locking member.
Figure 5:
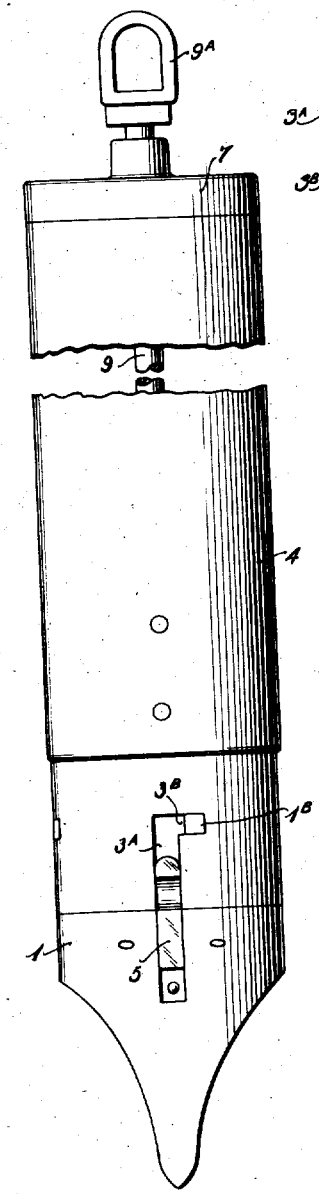
Figure 5 is a side plan view of the entire assembly.
Figure 6:
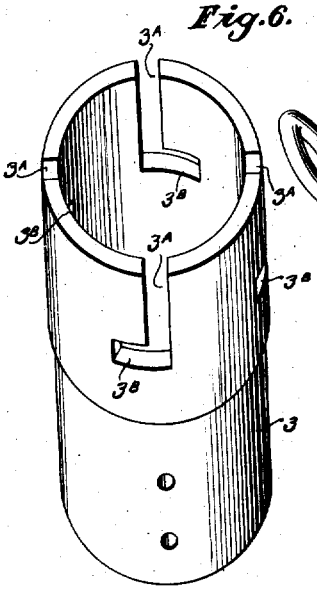
Figure 6 is a perspective view of the barrel bottom.
Figure 9:
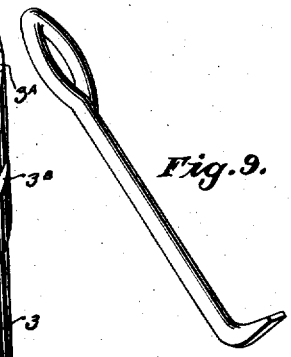
Figure 9 is a perspective view of a hook used to release the locking member.
Figure 8:
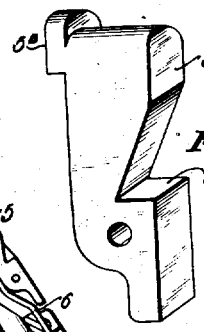
Figure 8 is a perspective view of the locking member.
Figure 7:
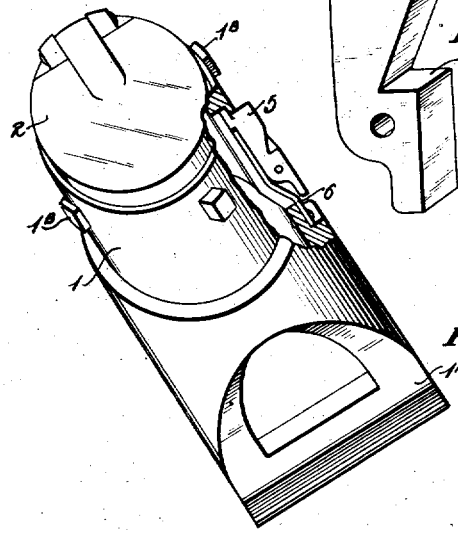
Figure 7 is a perspective view of the valve and cutting member partly sectioned to show a side view of the locking member.

The invention comprises a tubular member 1, having a flat pointed cutting web $1^a$ at the bottom, forming a part thereof. 2 is a cover hinged to the top of the tubular member 1 and seated thereon, forming a valve for the purpose hereinafter described. 3 is a tubular member which is riveted to the pump barrel 4, as shown at $4^a$. The lower end of the tubular member 3 is provided with four longitudinal slots $3^a$ having right angle circumferential slots at the termination thereof, as shown at $3^b$. The tubular member 1 is provided with four square bosses $1^b$, substantially the same size as the slots $3^a$ and $3^b$ in the tubular member 3. 5 is a locking member pivoted in the tubular member 1, as shown. 6 is a spring for the purpose of holding the top of the locking member 5 in an outward position. Thus it will be noted that the tubular member 3, which is attached to the barrel 4 may be slipped over the tubular member 1 by placing the bosses $1^b$ in the slots 32. When placing the tubular member 3 over the tubular member 1 it is necessary to press the top of the locking member 5 inwardly even with the outer diameter of the tubular member 1. The deposed portion $5^a$ in the locking member 5 provides a clearance for the lower end of the tubular member 3 when the locking member 5 is pressed downwardly for assembling. $5^b$ is a projection on the inner side of the locking member 5 to limit the outward travel of the same. When the tubular member 3 has been placed over the tubular member 1, and the bosses $1^b$ are even with the circumferential slots $3^b$, the tubular member 3 is then turned circumferentially on the tubular member 1 until the locking member 5 is even with one of the slots $3^a$ and the spring 6 forces the locking member 5 therein, thereby holding the tubular members 1 and 3 securely together. Figure 9 illustrates a hook which may be used to press the top of the locking member 5 inwardly by placing the said hook under the lower end of the said locking member and pulling outwardly. To remove the tubular member 3 from the tubular member 1, the top of the member 5 is pressed inwardly and the tubular member 3 is turned circumferentially on the tubular member 1 until the bosses $1^b$ are even with the longitudinal slots $3^a$, the tubular member 3 may then be slipped longitudinally and removed from the tubular member 1. The pump barrel is of the well known design having the centrally apertured plunger disposed in the barrel 4. 9 is a plunger rod which is attached to the plunger 8 and extending through the central aperture in the plug 7, having an apertured member $9^a$ at the top thereof for the purpose of attaching a cable. 10 is a flange on the plunger rod 9, which presses against the plug 7 and supports the sand pump when the same is being raised or lowered in a well. 11 is a centrally apertured disc slidably mounted on the plunger rod 9 between the flange 10 and the plunger 8.

In operation, the sand pump is lowered to the bottom of a well and the cutting web $1^a$ is used to spud and mix the sand with the fluid. The sand is then pumped into the barrel 4 by raising the plunger 8. It will be noted that on the upward stroke of the plunger 8, the suction created therebelow will open the hinged valve 2 and suck the sand into the barrel 4, and when the barrel is filled with fluid and sand the suction will cease and the hinged valve 2 will close, thereby retaining the sand in the barrel, the sand-pump is then raised to the surface and the hook, as shown in Figure 9, is placed under the lower end of the locking member 5 and pulled outwardly, thereby moving the upper portion of the locking member 5 inwardly out of the slot $3^a$. The tubular member 3 is then turned circumferentially on the tubular member 1, until the bosses $1^b$ are even with the slots $3^a$, the tubular member 1 is then removed allowing the sand in the barrel 4 to be emptied.

While it is believed from the foregoing description the nature, operation and advantages will be readily apparent, I desire to indicate that I do not limit myself to the specific construction herein shown and described, and that such changes may be resorted to, when desired, as fall within the scope of what is herein claimed.

What I claim is:

1. In a sand pump in combination with a working barrel and plunger; a slotted cylindrical member rigid upon the lower extremity of the said barrel; a valved cutting member having projections spaced around the periphery thereof and arranged to be inserted within the slots of said cylindrical member and having a stop shoulder; a spring pressed auxiliary locking lever on said cutting member having an upwardly extending finger engageable with the stop shoulder to have its outward movement restricted by the said shoulder, the lower end of the lever being formed to be gripped and moved outwardly to move the upper end of the lever inwardly thereby, to permit rotation of the locked members to effect release thereof.

2. In a sand pump for use in connection with oil wells and the like, the combination with a working barrel and plunger; a slotted cylindrical member associated with said barrel, a valved cutting member having projections spaced around the periphery thereof and arranged to be inserted within the slots of the said cylindrical member, a locking member associated with said cutting member adapted to engage the slotted portions of said cylindrical member when in operative position to thereby prevent relative movement of the cutting member with respect to the pump, said locking member being pivotally mounted on the cutting element and being adapted to be pulled outwardly from the bottom thereof to disengage the same from said slot to permit rotation of the cutting member to effect the release thereof from the cylinder.

3. In a sand pump, the combination with a cylindrical shell constituting the working barrel, of a plunger located within the confines of said barrel, bayonet slots being associated with the lower extremity of the barrel, a valved cutting member having projections spaced around the periphery thereof and arranged to be inserted within the vertical portions of the bayonet slots and thence rotated into engagement with the horizontal portions of the slots, a locking member being adapted to engage one of said vertical slots when the cutting element has been placed in operative position, said locking member being pivotally mounted on the cutting element adapted to have its lower end moved outwardly from its normal vertical position to move the upper end inwardly thereby, to permit the rotation of the cutting member with respect to the barrel to effect release thereof.

4. In a sand pump, the combination with a cylindrical shell constituting the working barrel, a plunger located within said barrel, bayonet slots being formed in the lower extremity of the barrel, a valved cutting member having projections spaced around the periphery thereof and arranged to be inserted into the vertical portions of the bayonet slots and thence rotated into engagement with the horizontal portions in said slots, a vertical slot formed in said cutting member, and coinciding with one of said vertical slots associated with the barrel when the cutting element is in operative position, a locking lever pivotally mounted on the cutting member and being adapted to have its upper portion engage one of the vertical slots of the said barrel to prevent relative movement of the cutting element with respect to the barrel, said locking member being adapted to have its lower end moved outwardly from its normal vertical position to thereby move the upper end inwardly out of engagement with the slot of the barrel to thereby permit rotation of the cutting element with respect to the barrel to effect release thereof, and means for preventing the upper end of the lever from moving outwardly beyond the confines of the barrel.

5. In a sand pump, the combination with a cylindrical shell constituting the working barrel, of a plunger located within the confines of the barrel, bayonet slots being formed in the lower extremity of the barrel, a valved cutting member having projections spaced around the periphery thereof and arranged to be inserted within the vertical portions of the bayonet slots and thence rotated into engagement with the horizontal portions of the slots to thereby secure the cutting element to the barrel, said cutting element having a slot therein coinciding with the vertical portion of one of the aforesaid bayonet slots when the cutting element is in position, a locking lever being adapted to engage one of the vertical slots when the cutting element has been placed into operative position, said locking member having its lower portion vertically disposed within the confines of the slot of the cutting element and being adapted to be pulled outwardly at its lower end to thereby move its upper end inwardly out of engagement with the bayonet slots to permit rotation of the cutting element with respect to the barrel to effect release thereof.

6. In a sand pump, the combination with a cylindrical shell constituting the working barrel, a slotted cylindrical extension for said barrel rigidly attached thereto, a valved cutting member, said valved cutting member having projections spaced around the periphery thereof and arranged to be inserted within the slots of the cylindrical member, said cutting element having a slot in the upper portion thereof, a locking lever pivotally connected with the cutting element within said slot thereof, said pivot for the lever being placed at a point below the lower extremities of the slotted cylindrical member, said locking member being adapted to engage the slotted portions of the cylindrical member when in operative position to thereby prevent relative movement of the cutting member with respect to the pump, and normally lying in a vertical position with its upper portion engaging the slots of the cylindrical member and the lower portion of the lever engaging the slot of the valved cutting member, said pivotal locking lever being adapted to be pulled outwardly from the bottom thereof only to disengage the same from the slot of the cylindrical member to permit rotation of the cutting member to effect the release thereof from the cylinder.

7. In a sand pump, the combination with a cylindrical shell constituting the working barrel, a slotted cylindrical extension for said barrel rigidly attached thereto, a valved cutting member, said valved cutting member having projections spaced around the periphery thereof and arranged to be inserted within the slots of the cylindrical member, said cutting element having a slot in the upper portion thereof, a locking lever pivotally connected with the cutting element within said slot thereof, said pivot for the lever being placed at a point below the lower extremities of the slotted cylindrical member, said locking member being adapted to engage the slotted portions of the cylindrical member when in operative position to thereby prevent relative movement of the cutting member with respect to the pump, and normally lying in a vertical position with its upper portion engaging the slots of the cylindrical member and the lower portion of the lever engaging the slot of the valved cutting member, said pivotal locking lever being adapted to be pulled outwardly from the bottom thereof only to disengage the same from the slot of the cylindrical member to permit rotation of the cutting member to effect the release thereof from the cylinder, and means for positively permitting the outward and downward movement of the upper end of said locking lever.

GEORGE J. ARMSTRONG.